(12) United States Patent
Sugiura

(10) Patent No.: US 7,275,435 B2
(45) Date of Patent: Oct. 2, 2007

(54) CAPACITANCE TYPE SEMICONDUCTOR DYNAMIC QUANTITY SENSOR

(75) Inventor: Makiko Sugiura, Hekinan (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/926,137

(22) Filed: Aug. 26, 2004

(65) Prior Publication Data
US 2005/0061075 A1    Mar. 24, 2005

(30) Foreign Application Priority Data
Sep. 22, 2003    (JP) .............. 2003-330143

(51) Int. Cl.
*G01P 15/125* (2006.01)
(52) U.S. Cl. .............. 73/514.32; 73/504.14
(58) Field of Classification Search .............. 73/514.32, 73/504.14
See application file for complete search history.

(56) References Cited

U.S. PATENT DOCUMENTS

| | | | |
|---|---|---|---|
| 5,744,719 A * | 4/1998 | Werner .................... | 73/514.32 |
| 6,151,966 A * | 11/2000 | Sakai et al. .............. | 73/514.32 |
| 6,170,332 B1 * | 1/2001 | MacDonald et al. ..... | 73/514.38 |
| 6,450,029 B1 * | 9/2002 | Sakai et al. .............. | 73/488 |
| 6,494,096 B2 * | 12/2002 | Sakai et al. ............. | 73/514.32 |
| 6,543,285 B2 * | 4/2003 | Hashimoto ............... | 73/504.14 |
| 6,694,814 B2 * | 2/2004 | Ishio ....................... | 73/514.32 |
| 6,960,488 B2 * | 11/2005 | Brosnihan et al. ........... | 438/52 |
| 2002/0011107 A1 * | 1/2002 | Sakai et al. ............. | 73/514.32 |
| 2005/0061075 A1 * | 3/2005 | Sugiura ................... | 73/514.32 |

FOREIGN PATENT DOCUMENTS

JP    A-11-304495    11/1999

* cited by examiner

*Primary Examiner*—Hezron Williams
*Assistant Examiner*—Samir M. Shah
(74) *Attorney, Agent, or Firm*—Posz Law Group, PLC

(57) ABSTRACT

A capacitance type semiconductor dynamic quantity sensor includes a beam-shaped movable electrode displaceable in a predetermined direction in response to application of a dynamic quantity to a support substrate, and beam-shaped fixed electrodes which are fixedly supported on the support substrate and disposed so that the side surface thereof faces a side surface of the movable electrode. The applied dynamic quantity is detected on the basis of variation of electric capacitance between the side surface of the movable electrode and the side surface of the fixed electrodes. Countermeasures are included to prevent sticking between the fixed electrodes and the movable electrode.

9 Claims, 10 Drawing Sheets

CAPACITANCE TYPE SEMICONDUCTOR DYNAMIC QUANTITY SENSOR

CROSS REFERENCE TO RELATED APPLICATION

This application is based upon, claims the benefit of priority of, and incorporates by reference the contents of, Japanese Patent Application No. 2003-330143 filed on Sep. 22, 2003.

FIELD OF THE INVENTION

The present invention relates to a capacitance type semiconductor dynamic quantity sensor for detecting an applied dynamic quantity on the basis of variation in electrostatic capacitance between each movable electrode and each fixed electrode.

BACKGROUND OF THE INVENTION

A capacitance type semiconductor dynamic quantity sensor is generally equipped with a beam-shaped movable electrode formed from a semiconductor, which is supported so as to be displaceable in a predetermined direction in accordance with an applied dynamic quantity relatively to a support substrate, and a beam-shaped fixed electrode formed from a semiconductor, which is fixedly supported on the support board and also disposed so that the side surface thereof faces the side surface of the movable electrode.

In the capacitance type semiconductor dynamic quantity sensor as described above, when the movable electrode is displaced in response to application of a dynamic quantity, the applied dynamic quantity is detected on the basis of variation in electrostatic capacitance between the side surface of the movable electrode and the side surface of the fixed electrode. Here, the dynamic quantity is acceleration, an angular velocity, pressure or the like.

Such a capacitance type semiconductor dynamic quantity sensor as described above has been proposed in, for example, JP-A-11-326365 hereinafter referred to as "Patent Document 1"). The acceleration sensor has such a comb-shaped structure that plural movable electrodes are disposed in a comb-shaped arrangement and also plural fixed electrodes are disposed in a comb-shaped arrangement so as to be respectively fitted in the gaps between the teeth of the comb-shaped arrangement of the movable electrodes When a smaller dynamic quantity is required to be detected by the capacitance type semiconductor dynamic quantity sensor as described above, there may be used a method of increasing the length of the beam-shaped movable and fixed electrodes to increase the confronting area between these electrodes, so that the initial capacitance is increased and thus sensitivity is enhanced.

In the case of this method, however, the electrodes are weak in rigidity and sag because the electrode length is increased, so that a phenomenon that the movable and fixed electrodes are brought into contact with each other and become stuck to each other, referred to as sticking, is liable to occur. Such sticking causes operation failure of the sensor, etc., and thus it must be avoided.

There is henceforth increasingly required a sensor that can detect a smaller dynamic quantity with high sensitivity, and thus the movable and fixed electrodes are required to be increased in length.

However, in this case, the movable and fixed electrodes are more liable to sag, and thus sticking is more liable to occur.

Here, when the movable and fixed electrodes are increased in length, it may be simply considered that the rigidity of the electrodes could be enhanced by increasing the width of each of these electrodes. However, the increase in width of both the movable and fixed electrodes causes increase in size of the substrate area constituting the sensor. Therefore, this is not preferable.

SUMMARY OF THE INVENTION

The present invention has been implemented in view of the foregoing problem, and has an object to provide a capacitance type semiconductor dynamic quantity sensor that achieves maximum prevention of sticking between movable and fixed electrodes while suppressing an increase of the body size thereof when the movable and fixed electrodes are designed to be long in length to thereby enhance sensitivity.

In order to attain the above object, according to a first aspect of the present invention, a capacitance type semiconductor dynamic quantity sensor comprising a support substrate, a beam-shaped movable electrode which is supported to be displaceable in a predetermined direction in response to application of a dynamic quantity to the support substrate and formed of a semiconductor, and beam-shaped fixed electrodes which are fixedly supported on the support substrate and disposed so that the side surface thereof faces the side surface of the movable electrode, wherein when the movable electrode is displaced in accordance with the application of the dynamic quantity, the applied dynamic quantity is detected on the basis of variation of the electric capacitance between the side surface of the movable electrode and the side surface of the fixed electrode is characterized in that the width of any one of the movable and fixed electrode is set to be larger than the width of the other electrode.

With the above construction, one of the movable and fixed electrodes having a larger width can be designed to be increased in rigidity, so that the one electrode having the larger width is hard to sag. As a result, the sticking between the movable and fixed electrodes can be more greatly suppressed as compared with the conventional sensor.

Furthermore, as compared with a case where both the movable and fixed electrodes are designed to be larger in width, increase of the size of the substrate constituting the sensor can be more greatly suppressed because any one of the movable and fixed electrodes may be designed to be larger in width.

Accordingly, when the movable and fixed electrodes of the capacitance type semiconductor dynamic quantity sensor of the present invention are designed to be increased in length to enhance the sensitivity, maximum prevention of the sticking between both the movable and fixed electrodes can be achieved while suppressing the increase of the body size as much as possible.

Furthermore, according to a second aspect of the present invention, in the capacitance type semiconductor dynamic quantity sensor of the first aspect, the width-larger electrode out of the movable and fixed electrodes is preferably designed to be larger in width than the width-smaller electrode by 0.5 µm or more.

According to a third aspect of the present invention, a capacitance type semiconductor dynamic quantity sensor having a support board, a beam-shaped movable electrode which is supported so as to be displaceable in response to application of a dynamic quantity to the support substrate and formed from a semiconductor, and beam-shaped fixed electrodes which are fixedly supported on the support substrate so that the side surfaces thereof face the side surface of the movable electrode and formed from a semiconductor, an applied dynamic quantity being detected on the basis of variation in electrostatic capacitance between the side surface of the movable electrode and the side surface of each of the fixed electrodes when the movable electrode is displaced in response to the application of the dynamic quantity is characterized in that: the side surface of at least one of the movable and fixed electrodes is equipped with adherence preventing projecting portions projecting from the side surface concerned at sites where the side surfaces of the movable and fixed electrodes face each other so that the projecting portions are arranged along a longitudinal direction of the movable and fixed electrodes; when L represents the length of the movable and fixed electrodes at the sites where the side surfaces of the movable and fixed electrodes face each other, La represents the distance between neighboring projecting portions in the arrangement of the projecting portions, σ2(x) represents a sagging amount, W represents the width of the electrodes, h represents the thickness of the electrodes, d2 represents the height of the projecting portions, V represents the voltage applied between the movable electrode and the fixed electrode, and Fe(x) represents the electrostatic force applied between the electrodes, $$\sigma 2(x) = [\{Fe(x) \cdot La^3\}/(48 \cdot E \cdot I)] \times (5/8)$$

$$I = W^3 \cdot h/12$$

$$Fe(x) = \epsilon 0 \cdot V^2/(2 \cdot d2^2) \cdot h \cdot L$$

La/L, W, d2 are determined so that the sagging amount σ2(x) is less than the half of the height d2 of the projecting portions (σ2(x)<d2/2).

Furthermore, in the above capacitance type dynamic quantity sensor, the ratio of the distance La to the length L (La/L) is set in the range from 0.1 to 0.9.

With the above construction, when the movable and fixed electrodes are brought into contact with each other, both the electrodes come into contact with each other through the projecting portions, so that the contact area between the movable and fixed electrodes can be reduced. Therefore, the sticking between the movable and fixed electrodes hardly occurs.

Furthermore, when the movable and fixed electrodes come into contact with each other through the projecting portions, the movable and fixed electrodes are about to sag at a site between respective neighboring projecting portions. However, by setting the ratio La/L in the range from 0.1 to 0.9, the sagging amount of the movable and fixed electrodes between the projecting portions can be reduced. Therefore, the contact between the movable and fixed electrodes due to the sagging of these electrodes can be prevented.

Accordingly, when the movable and fixed electrodes of the capacitance type semiconductor dynamic quantity sensor of the present invention are designed to be increased in length to thereby enhance the sensitivity, maximum prevention of the sticking between the movable and fixed electrodes can be prevented while suppressing the increase of the body size as much as possible.

According to a fourth aspect of the present invention, in the capacitance type semiconductor dynamic quantity sensor of the third aspect, projecting portions may be equipped to the side surfaces of both the movable and fixed electrodes at sites where the side surfaces of the movable and fixed electrodes face each other.

According to a fifth aspect of the present invention, in the capacitance type semiconductor dynamic quantity sensor of the third or fourth aspect, any one of the movable and fixed electrodes may be designed to be larger in width than the other electrode.

With the above construction, in the capacitance type semiconductor dynamic quantity sensor of the third or fourth aspect of the present invention, the effect of the first aspect can be also achieved.

In this case, the width-larger electrode out of the movable and fixed electrodes is preferably set to be larger in width than the width-smaller electrode by 0.5 μm or more as in the case of the sixth aspect.

According to a seventh aspect of the present invention, in the capacitance type semiconductor dynamic quantity sensor of the third or fourth aspect of the present invention, when the length L is set to 500 μm or less and the width of the movable and fixed electrodes is set to 2 μm, the ratio La/L may be set in the range from 0.1 to 0.5.

According to an eighth aspect of the present invention, in the capacitance type semiconductor dynamic quantity sensor of the third or fourth aspect, when the length L is set to 500 μm or less and the width of the movable and fixed electrodes is set to 3 μm, the ratio La/L may be set in the range from 0.1 to 0.7.

According to a ninth aspect of the present invention, in the capacitance type semiconductor dynamic quantity sensor of the third or fourth aspect, when the length L is set to 500 μm or less and the width of the movable and fixed electrodes is set to 4 μm, the ratio La/L may be set in the range from 0.1 to 0.9.

In the seventh to ninth aspects of the present invention, the width of the movable and fixed electrodes contains an error of about ±10% in consideration of tolerance on the manufacturing process, etc. For example, when the width is set to 2 μm, the width concerned may range from 1.8 μm to 2.2 μm.

According to a tenth aspect of the present invention, a capacitance type semiconductor dynamic quantity sensor having a support board, a beam-shaped movable electrode supported to be displaceable in response to application of a dynamic quantity to the support substrate and formed of semiconductor, and beam-shaped fixed electrodes which are fixedly supported on the support substrate so that the side surfaces thereof face the side surface of the movable electrode and formed of semiconductor, an applied dynamic quantity being detected on the basis of variation in electrostatic capacitance between the side surface of the movable electrode and the side surface of each of the fixed electrodes when the movable electrode is displaced in response to the application of the dynamic quantity is characterized in that: the width of any one of the movable and fixed electrodes is set to be larger than that of the other electrode, the side surface of at least one of the movable and fixed electrodes is equipped with adherence preventing projecting portions projecting from the side surface concerned at sites where the side surfaces of the movable and fixed electrodes face each other so that the projecting portions are arranged along a longitudinal direction of the movable and fixed electrodes; and when L represents the length of the movable and fixed electrodes at the sites where the side surfaces of the movable and fixed electrodes face each other, La represents the distance between neighboring projecting portions in the arrangement of the projecting portions, σ2(x) represents a sagging amount, W represents the width of the electrodes, h represents the thickness of the electrodes, d2 represents the height of the projecting portions, V represents the voltage applied between the movable electrode and the fixed electrode, and Fe(x) represents the electrostatic force applied between the electrodes, $$\sigma 2(x)=[\{Fe(x)\cdot La^3\}/(48\cdot E\cdot I)]\times(5/8)$$

$$I=W^3\cdot h/12$$

$$Fe(x)=\epsilon 0\cdot V^2/(2\cdot d2^2)\cdot h\cdot L$$

La/L, W, d2 are determined so that the sagging amount σ2(x) is less than the half of the height d2 of the projecting portions (σ2(x)<d2/2).

In the above capacitance type dynamic quantity sensor, the ratio of the distance La to the length L (La/L) is set in the range from 0.1 to 0.9.

According to the tenth aspect of the present invention, a capacitance type semiconductor dynamic quantity sensor is provided that has the same action and effect as the fifth aspect of the present invention.

According to an eleventh aspect of the present invention, in the capacitance type semiconductor dynamic quantity sensor of the first to tenth aspects, a plurality of movable electrodes are disposed in a comb-shaped arrangement, and a plurality of fixed electrodes are disposed in a comb-shaped arrangement so as to be fitted in the gaps between the teeth of the comb-shaped arrangement of the movable electrodes. The movable and fixed electrodes in the above aspects may be designed to have a comb-shape as described above.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
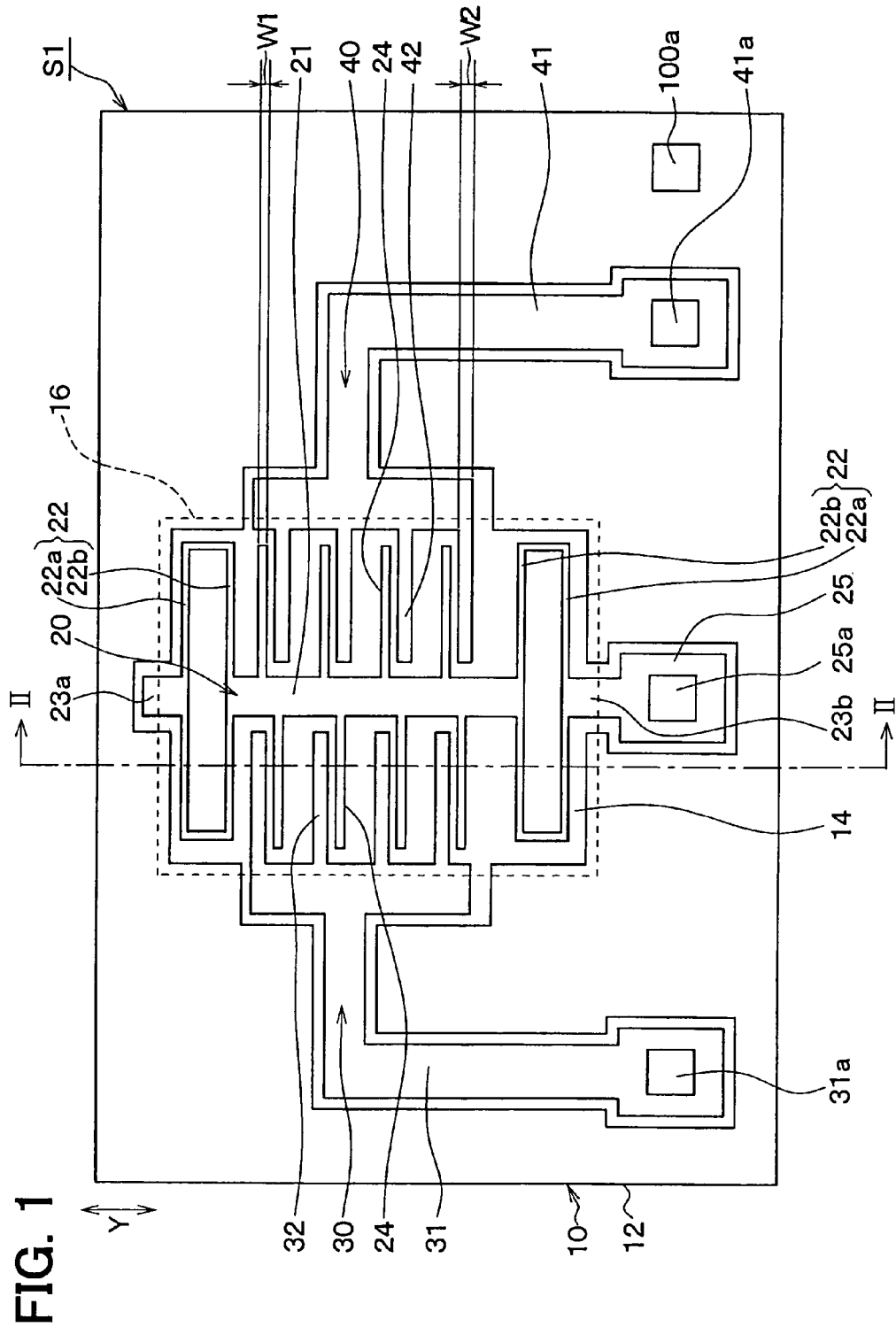
FIG. 1 is a plan view of a differential capacitance type acceleration sensor as a capacitance type dynamic quantity sensor according to a first aspect.

Preferred embodiments according to the present invention will be described hereunder with reference to the accompanying drawings. In the following embodiments, the same or equivalent elements are represented by the same reference numerals to simplify the description of the embodiments.

First Embodiment

Figure 2:
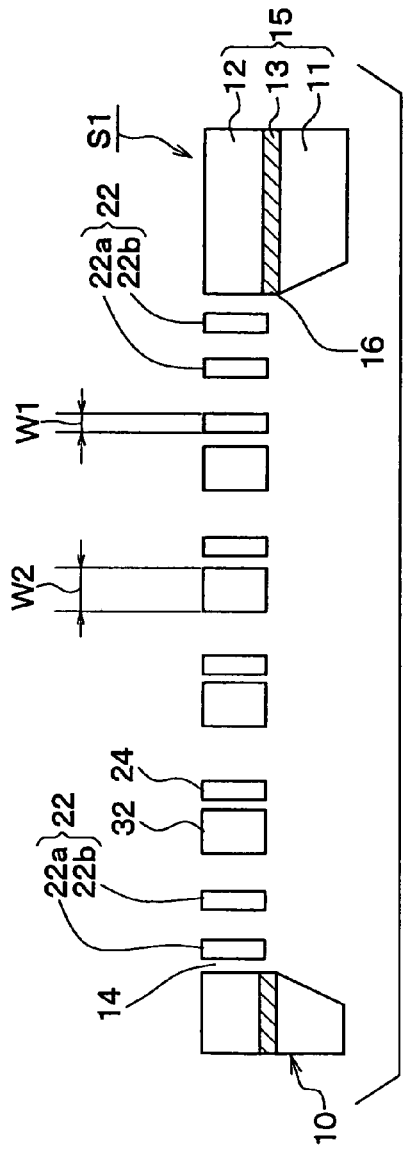
FIG. 2 is a cross-sectional view taken along line II-II of FIG. 1.

FIG. 1 is a plan view showing a differential capacitance type acceleration sensor S1 as a capacitance type semiconductor dynamic quantity sensor according to a first embodiment of the present invention, and FIG. 2 is a cross-sectional view taken along line II-II of the sensor S1 of FIG. 1.

The acceleration sensor S1 may be applied to a vehicle acceleration sensor for controlling the operations of an air bag, ABS, VSC, etc., a gyro sensor or the like.

The acceleration sensor S1 is formed by subjecting well-known micro-machining to a semiconductor substrate 10.

As shown in FIG. 2, the semiconductor substrate 10 constituting the acceleration sensor S1 comprises a rectangular SOI (Silicon On Insulator) substrate 10 comprising a first silicon substrate 11, a second silicon substrate 12 and oxide film 13 as an insulating layer between the first silicon substrate 11 and the second silicon substrate 12.

In this embodiment, the first silicon substrate 11 and the oxide film 13 of the SOI substrate 10 are constructed as the support substrate 15.

A groove 14 is formed in the second silicon substrate (SOI layer) 12 to form beam structures 20, 30 and 40. These beam structures 20, 30, 40 have a comb-shape, and comprise the movable portion 20 which is movably joined to a base portion (support substrate) 15, and fixed portions 30, 40 fixed to the base portion 15.

Furthermore, the portions of the second silicon substrate 12 which are located at the oxide film 13 side in the comb-shaped areas of the movable portion 30 and the fixed portions 30 and 40 are removed as shown in FIG. 2, so that the second silicon substrate 12 at these portions are floated above the oxide film 13.

Here, in this modification, at the sites corresponding to the formation areas of the comb-shaped portions of the movable portion 20 and the fixed portions 30 and 40, the oxide film 13 and the first silicon substrate 11 of the support substrate 15 located beneath the sites are removed. An opening portion 16 is formed from this removed portion of the support substrate 15.

The sensor S1 as described above is manufactured as follows. A mask having the shape corresponding to the beam structures is formed on the second silicon substrate 12 of the SOI substrate by using a photolithography technique, and then trench etching is conducted with gas of $CF_4$, $SF_6$ or the like by dry etching or the like to form the groove 14, thereby forming the beam structures 20 to 40 in a lump.

Subsequently, the site corresponding to the opening portion 16 is etched from the back side of the SOI substrate 10, that is, from the first silicon substrate 11 side by anisotropic etching using KOH or the like or etching using hydrofluoric acid. Furthermore, dry etching using gas of $CF_4$, $CHF_3$ or the like may be used. Through this step, the opening portion 16 is formed.

In the acceleration sensor S1 as described above, the movable portion 20 is disposed so as to cross the center portion of the SOI substrate 10 as shown in FIG. 1.

The movable portion 20 has a poise (weight) portion 21 and spring portions 22 at both the ends of the poise portion 21. The spring portions 22 at both the ends of the poise portion 21 are integrally joined to the anchor portions 23a and 23b.

Here, the anchor portions 23a, 23b are those portions which are supported on the oxide film 13 of the support substrate 15. That is, the movable portion 20 is suspended between the anchor portions 23a and 23b fixed to the oxide film 13 and the poise portion 21 and the spring portions 22 are suspended on the oxide film 13.

Each of the spring portions 22 is designed in such a rectangular shape that two parallel beams 22a and 22b are joined to each other at both the ends thereof, and the spring portions 22 have such a spring function that they are elastically displaced in a direction perpendicular to the longitudinal direction of the two beams 22a and 22b.

Specifically, when acceleration containing an acceleration component in a direction of an arrow Y of FIG. 1 is applied to the spring portions 22, the spring portions 22 displace the poise portion 21 in the direction of the arrow Y, and also restore the poise portion 21 to the original state in accordance with dissipation of the acceleration.

In other words, each of the spring portions 22 has two beams 22a and 22b as a pair of confronting portions along the direction of the arrow Y, and also is elastically deformed so that the interval between the two beams 22a and 22b is increased and reduced.

Accordingly, the movable portion 20 is supported on the support substrate 15, and displaceable in the displacement direction of the spring portions 22, that is, in the direction of the arrow Y in accordance with application of acceleration. Here, the direction of the arrow Y will be hereinafter referred to as "displacement direction Y".

The movable portion 20 has a plurality of beam-shaped movable electrodes 24 extending from both side surfaces of the poise portion 21 in the opposite directions along a direction perpendicular to the displacement direction Y. In FIG. 1, every four movable electrodes 24 are formed at each of the right and left sides of the poise portion 21 so as to project from the side surfaces of the poise portion 21, and each movable electrode 24 is formed in a beam shape having a rectangular section.

The respective numbers of the movable electrodes and fixed electrodes are set to four at each of the right and left sides of the poise portion 21 in FIG. 1. However, these numbers are determined on the basis of the detection range, and thus they may be set to any numbers.

As described above, each movable electrode 24 is integrally formed with the spring portions 22 and the poise portion 21 as a part of the movable portion 20, and supported on the support substrate 15. The movable electrodes 24 are displaceable in the displacement direction Y together with the poise portion 21.

The fixed portions 30 and 40 are equipped at both sides of the poise portion 21 of the movable portion 20 so that the poise portion 21 is sandwiched by the fixed portions 30 and 40, and they comprise a first fixed portion 30 located at the left side of FIG. 1 and a second fixed portion 40 located at the right side of FIG. 1. These fixed portions 30 and 40 are electrically independent of each other.

Each of the fixed portions 30 and 40 comprises a wire portion 31 (41) which is fixed to the oxide film 13 and supported on the first silicon substrate 11, and plural (four in the figure) fixed electrodes 32 (42) which are spaced from the side surfaces of the movable electrodes 24 at a predetermined detection interval in parallel to the side surfaces of the movable electrodes 24 while confronting the side surfaces of the movable electrodes 24.

Here, the fixed electrodes 32 of the first fixed portion 30 will be referred to as "first fixed electrodes 32" and the fixed electrodes 42 of the second fixed electrode 40 will be referred to as "second fixed electrodes 42".

Each of the first fixed electrodes 32 and the second fixed electrodes 42 is designed in a beam-shape having a rectangular section so as to extend substantially in parallel to the movable electrodes 24. The respective fixed electrodes 32 and 42 are cantilevered by the wire portions 31 and 41, respectively, and kept to be floated from the oxide film 13.

As described above, according to this embodiment, a plurality of movable electrodes 24 are arranged to form a comb-shape extending along the direction perpendicular to the displacement direction Y, and a plurality of fixed electrodes 32 (42) are disposed in a comb-shaped arrangement so as to be fit in the gaps between the neighboring teeth of the comb-shaped arrangement of the movable electrodes 24.

In this embodiment, as shown in FIGS. 1 and 2, the width W2 of the fixed electrodes 32 and 42 is set to be larger than the width W1 of the movable electrodes 24.

Specifically, the width W2 of the width-larger fixed electrodes 32 and 42 is preferably set to be larger than the width of the width-smaller movable electrodes 24 by 0.5 μm or more. Furthermore, the width W2 of the width-larger fixed electrodes 32 and 42 is preferably set to be larger within the range of the double of the width W1 of the width-smaller movable electrodes 24.

Fixed electrode pads 31a and 41a for wire bonding are formed at predetermined positions on the wire portions 31 and 41 of the fixed portions 30 and 40, respectively.

A wire portion 25 for the movable electrodes is formed while integrally joined to one anchor portion 23b, and also a movable electrode pad 25a for wire bonding is formed at a predetermined position on the wire portion 25.

Furthermore, an electrode pad 100a is formed to set a potential to the second silicon substrate 12 other than the beam structures 20 to 40. The respective electrode pads 25a, 31a, 41a, 100a are formed of aluminum or the like.

Furthermore, the acceleration sensor S1 of this embodiment is fixed to a package (not shown) through adhesive or the like at the back surface side of the first silicon substrate 11, that is, at the opposite surface side of the first silicon substrate 11 to the oxide-film 13 side. A circuit unit including a detection circuit 100 is mounted in the package (see FIG. 3) described later.

The circuit unit and each of the electrode pads 25a, 31a, 41a and 100a are electrically connected to each other through a wire (not shown) formed by wire bonding of gold or aluminum.

In the acceleration sensor S1 having the basic construction as described above, that is, the construction including the movable portion 20 and the fixed portions 30 and 40, the acceleration is detected as follows.

In the above construction, a first capacitor (capacitance) CS1 is formed in the electrode gaps between the first fixed electrodes 32 and the movable electrodes 24 and a second capacitor (capacitance) CS2 is formed in the electrode gaps between the second fixed electrodes 42 and the movable electrodes 24.

When acceleration is applied, the overall movable portion 20 is integrally displaced in the displacement direction Y by the spring function of the spring portions 22 and each capacitance CS1, CS2 is varied in accordance with the displacement of the movable electrodes 24. The detection circuit 100 detects the acceleration on the basis of the variation of the differential capacitance (CS1–CS2) based on the movable electrodes 24 and the fixed electrodes 32 and 42.

Figure 3:
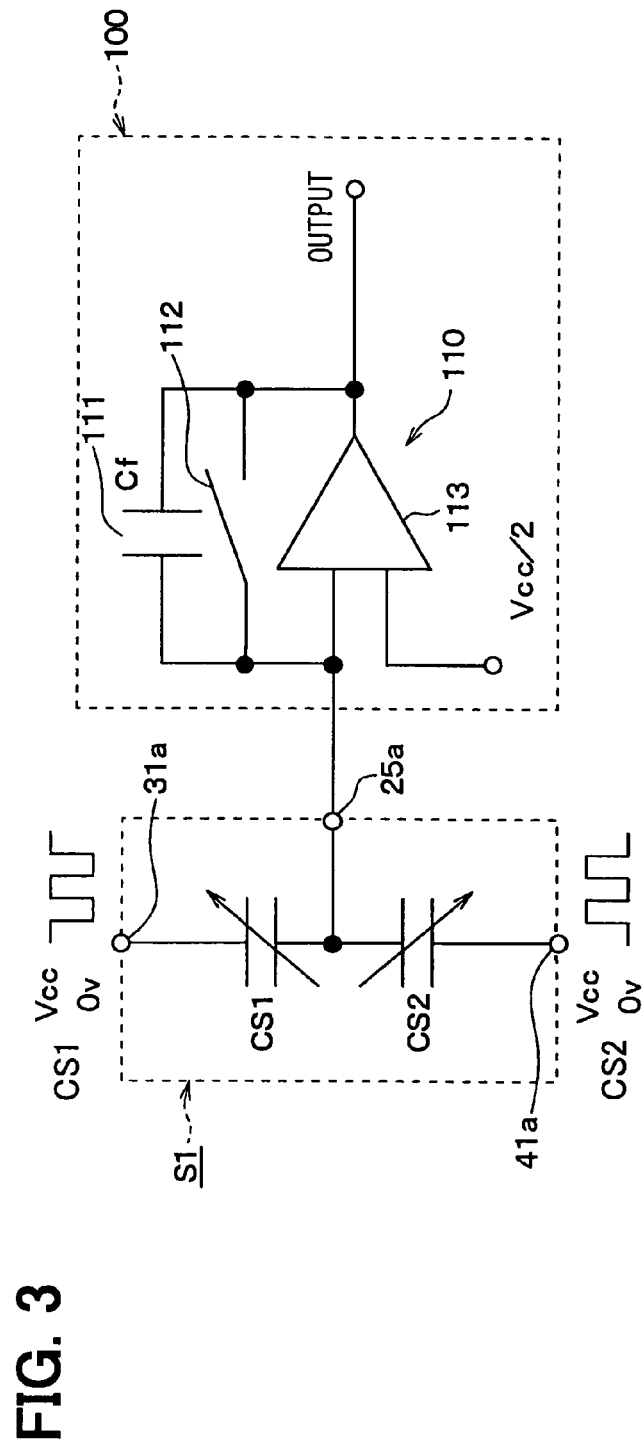
FIG. 3 is a detection circuit diagram of the acceleration sensor of the first embodiment.

FIG. 3 is a diagram showing the detection circuit of the acceleration sensor S1. In the detection circuit 100, reference numeral 110 represents a switched capacitor circuit (SC circuit). The SC circuit 110 has a capacitor 111 having capacitance Cf, a switch 112 and a differential amplifying circuit 113, and converts the capacitance difference (CS1–CS2) to the corresponding voltage.

In the acceleration sensor S1 of this embodiment, a carrier signal CS1 having amplitude Vc is input from the fixed electrode pad 31a, and a carrier signal CS2 which is shifted in phase from the carrier signal 1 by 180° is input from the fixed electrode pad 41 to open/close the switch 112 of the SC circuit 110 at a predetermined timing. The applied acceleration is output as a voltage value V0 as shown in the following equation (1).

$$V0=(CS1-CS2)\cdot Vcc/CF \quad (1)$$

The acceleration sensor S1 of this embodiment detects the acceleration as described above.

According to the acceleration sensor S1 shown in FIGS. 1 and 2, in the acceleration sensor in which the beam-shaped movable electrodes 24 and the fixed electrodes 32 and 42 disposed so that the side surfaces thereof are confronted to the side faces of the movable electrodes 24 are equipped on the support substrate 15 and applied acceleration is detected on the basis of the variation of the electrostatic capacitance between the movable electrodes 24 and the fixed electrodes 32 (42) when the side surfaces of the electrodes 24 and 32 when the movable electrodes 24 are displaced in accordance with the application of the acceleration, the width W2 of the fixed electrodes 32 (42) is set to be larger than the width W1 of the movable electrodes 1.

According to the above construction, the width-larger fixed electrodes 32 and 42 having the width W2 is increased in rigidity and thus it is hard to sag. As a result, the sticking between the movable electrode 24 and the fixed electrode 32, 42 can be more greatly suppressed as compared with the prior art.

As compared with the case where both the widths of each movable electrodes and each fixed electrode are set to be larger, the increase in size of the substrate 10 constituting the acceleration sensor S1 of this embodiment can be suppressed as much as possible because only the width W2 of the fixed electrodes 32 and 42 is increased.

Therefore, according to the acceleration sensor S1 of this embodiment, when the movable electrodes 24 and the fixed electrodes 32 and 42 are increased in length to enhance the sensitivity, the sticking between each movable electrode 24 and each fixed electrode 32 (42) can be prevented at maximum with suppressing the increase of the body size as much as possible.

Furthermore, as described above, in the acceleration sensor S1 of this embodiment, it is preferable that the width W2 of the width-larger fixed electrodes 32 and 42 is set to be larger than the width W1 of the width-smaller movable electrodes 24 by 0.5 µm or more.

This width is based on the fact that the sagging amount is proportional to the cubic of the width of the electrodes in the beam-shaped electrodes. That is, if the width of the fixed electrodes 32 and 42 is set to be larger than the width of the movable electrodes 24 by about 0.5 µm, the sagging amount of the fixed electrodes 32 and 42 could be more greatly reduced as compared with that of the movable electrodes 24.

Furthermore, as described above, it is preferable that the width W2 of the width-larger fixed electrodes 32 and 42 is larger than the width W1 of the width-smaller movable electrodes 24 by the double the width W1 or less. This is because if the width W2 of the fixed electrodes 32 and 42 is excessively increased, the increase of the size of the substrate 10 is remarkable.

For example, in the prior art, both the width W1 of the movable electrodes 24 and the width W2 of the fixed electrodes 32 and 42 are set to about 4 µm. On the other hand, according to the acceleration sensor S1 of this embodiment, when the width W1 of the movable electrodes 24 is set to 4 µm, the width W2 of the fixed electrodes 32 and 42 can be increased to a value in the range from 4.5 µm to 8 µm.

[Modifications]

Figure 4:
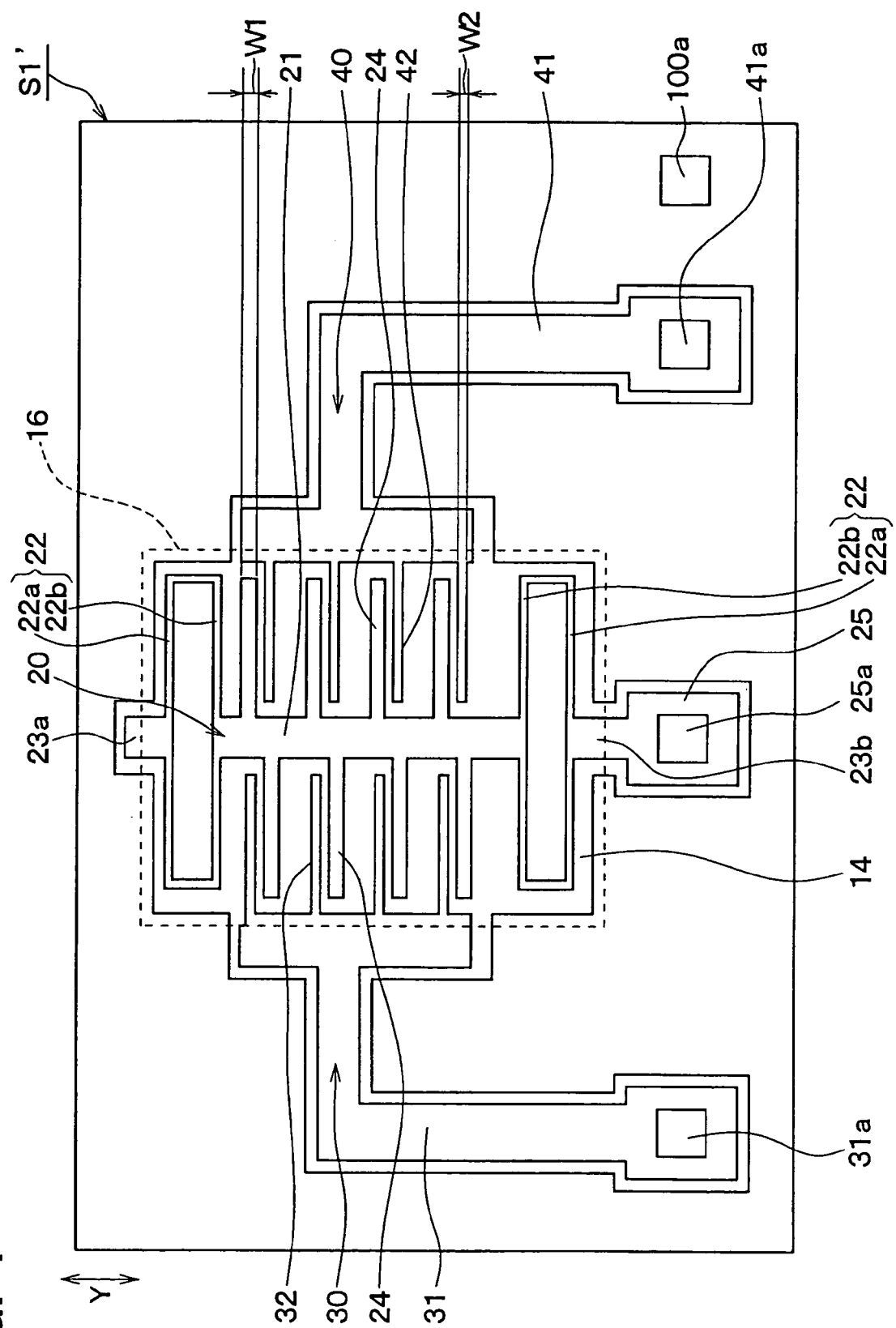
FIG. 4 is a diagram showing the planar construction of the differential capacitance type acceleration sensor according to a modification to the first embodiment.

FIG. 4 is a diagram showing a planar construction of a differential capacitance type acceleration sensor S1' as a modification of the embodiment.

In the acceleration sensor S1 shown in FIGS. 1 and 2, the width W2 of the fixed electrodes 32 and 42 is larger than the width W1 of the movable electrodes 24.

On the other hand, in this modification, the width W1 of the movable electrodes 24 is set to be larger than the width W2 of the fixed electrodes 32 and 42.

That is, in this modification, in the acceleration sensor S in which the beam-shaped movable electrodes 24 and the fixed electrodes 32 and 42 disposed so that the side surfaces thereof are confronted to the side surfaces of the movable electrodes 24 are equipped on the support substrate 15, and when the movable electrodes 24 are displaced in accordance with an application of acceleration, the applied acceleration is detected on the basis of the variation of the electrostatic capacitance between the side surfaces of the movable and fixed electrodes 24, 32, 42, the width W1 of the movable electrodes 24 is set to be larger than the width W2 of the fixed electrodes 32 and 42.

According to the above construction, the width-larger movable electrodes having the width W1 are increased in rigidity and thus they are hard to sag.

Furthermore, as compared with a case where both the widths of the movable and fixed electrodes are increased, only the width W1 of the movable electrodes 24 is increased in the acceleration sensor S1', so that the increase in size of the substrate 10 constituting the sensor S1' can be suppressed at maximum.

Therefore, according to the acceleration sensor S1', when the movable electrodes 24 and the fixed electrodes 32 and 42 are increased in length to enhance the sensitivity, the sticking between both the electrodes 24, 32, 42 can be prevented at maximum with suppressing the increase of the body size as much as possible.

Furthermore, in the acceleration sensor S1' of this modification, it is preferable that the width W1 of the width-larger movable electrodes is set to be larger than the width W2 of the width-smaller fixed electrodes 32 and 42 by 0.5 µm or more.

The width of the width-larger movable electrodes 24 is preferably set to be larger than the width W2 of the fixed electrodes 32 and 42 by double the width W2 or less. The grounds for which the preferable embodiment of this modification is based is the same as described above.

For example, in the acceleration sensor S1' of this modification, when the width W2 of the fixed electrodes 32 and 42 is set to 4 µm, the width W1 of the movable electrodes 24 can be increased to a value in the range from 4.5 µm to 8 µm.

Furthermore, in this modification, since the width W1 of the movable electrodes is set to be larger than the width W2 of the fixed electrodes 32 and 42, the weight of each movable electrodes 24 can be increased, that is, the weight of the movable portion 20 can be increased. This contributes to enhancement of the sensitivity.

As described above, the acceleration sensor is equipped with the support substrate 15, the beam-shaped movable electrodes which is supported so as to be displaceable with respect to the support substrate 15 in the displacement direction Y in accordance with application of acceleration and formed of semiconductor, and the beam-shaped fixed electrodes 32 and 42 which are fixedly supported on the support substrate 15 and disposed so that the side surfaces thereof are confronted to the side surfaces of the movable electrodes 24, the applied acceleration being detected on the basis of the variation of the electrostatic capacitance between the side surface of each movable electrode 24 and the side surface of each of the fixed electrodes 32 and 42, and is characterized in that the width of any one of the movable electrode 24 and the fixed electrode 32 (42) is set to be larger than the width of the other electrode.

Accordingly, when the movable electrodes 24 and the fixed electrodes 32 and 42 are increased in length to enhance the sensitivity, the sticking between the movable electrode 24 and the fixed electrode 32 (42) can be prevented at maximum with suppressing the increase of the body size as much as possible.

Second Embodiment

Figure 5:
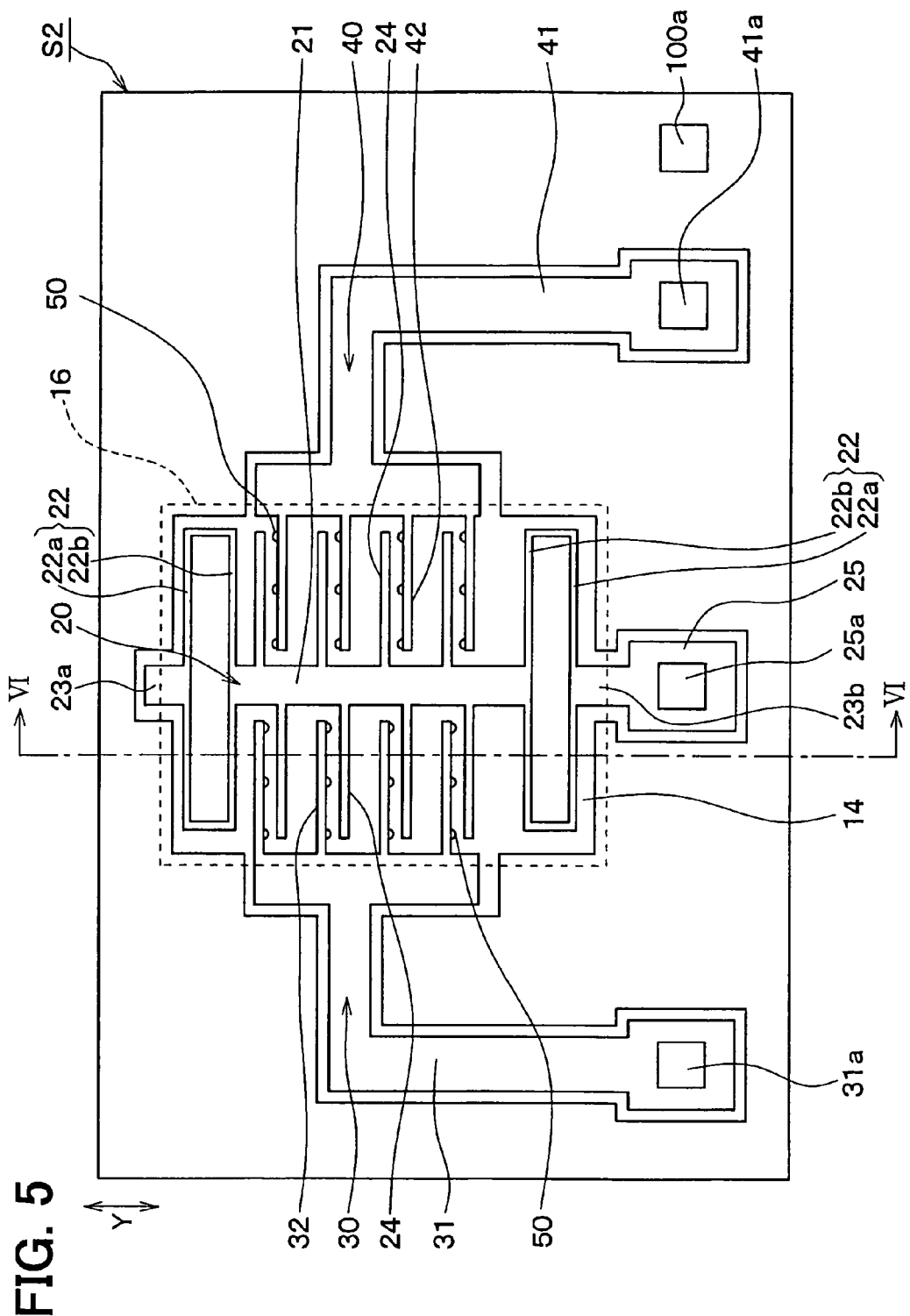
FIG. 5 is a plan view of a differential capacitance type acceleration sensor as a capacitance type semiconductor dynamic quantity sensor according to a second embodiment.
Figure 6:
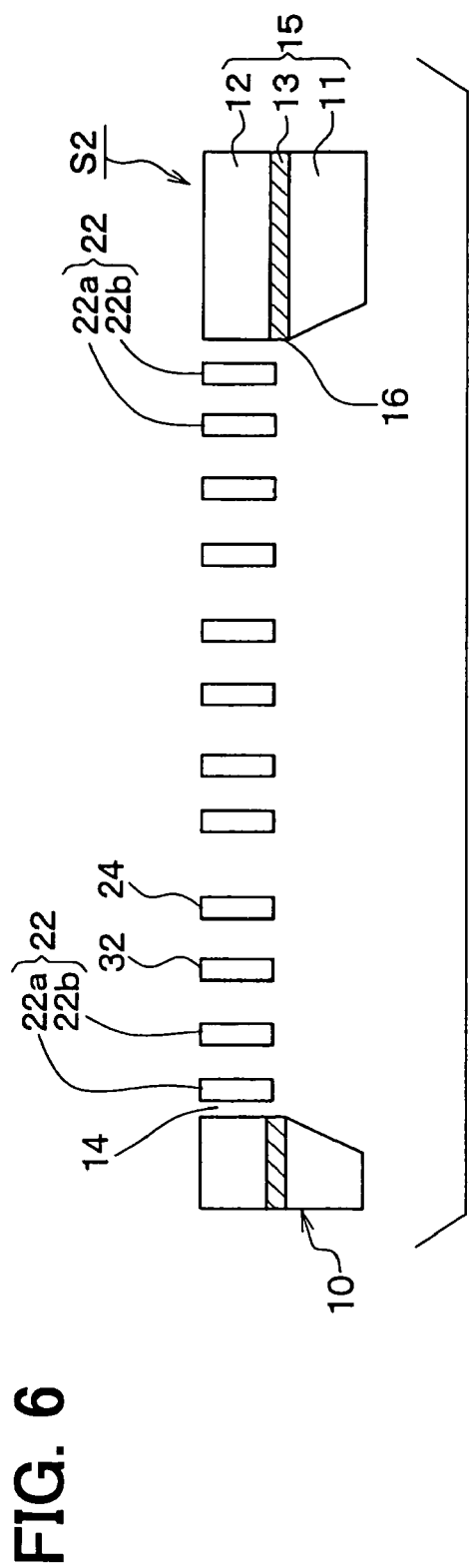
FIG. 6 is a cross-sectional view taken along line VI-VI of FIG. 5.

FIG. 5 is a schematic plan view of a differential capacitance type acceleration sensor S2 as a capacitance type semiconductor dynamic quantity sensor according to a second embodiment of the present invention, and FIG. 6 is a schematic cross-sectional view of the sensor S2 which is taken along line VI-VI of FIG. 1.

Figure 7:
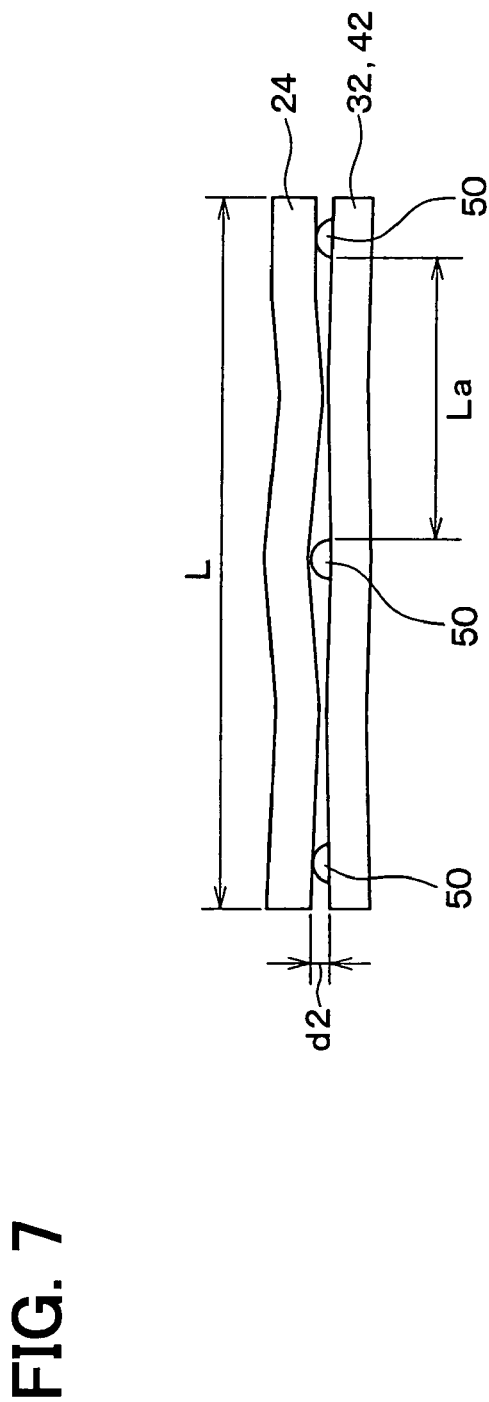
FIG. 7 is an enlarged plan view of a site where the side surface of a movable electrode and the side surface of a fixed electrode face each other in the acceleration sensor shown in FIG. 5.

FIG. 7 is an enlarged plan view showing a site where the side surface of the movable electrode 24 and the side surface of the fixed electrode 32, 42 in the sensor S2.

This acceleration sensor S2 is also applicable to a vehicle acceleration sensor for controlling the operation of an air bag, ABS, VSC or the like, a gyro sensor or the like.

The sensor construction, sensor manufacturing method and detection operation of the acceleration sensor S2 of this embodiment are the same as the first embodiment.

However, the acceleration sensor S2 is different from that of the first embodiment in that the widths of the movable electrodes 24 and the fixed electrodes 32 and 42 are the same. A different point of this embodiment from the first point, that is, a unique feature point of this embodiment will be mainly described.

In the acceleration sensor S2 of the second embodiment shown in FIGS. 5, 6 and 7, there is the following feature point in the acceleration sensor having the support substrate 15, the beam-shaped movable electrodes which is supported so as to be displaceable with respect to the support substrate 15 in the displacement direction Y in accordance with application of acceleration and formed of semiconductor, and the beam-shaped fixed electrodes 32 and 42 which are fixedly supported on the support substrate 15 and disposed so that the side surfaces thereof are confronted to the side surfaces of the movable electrodes 24, the applied acceleration being detected on the basis of the variation of the electrostatic capacitance between the side surface of each movable electrode 24 and the side surface of each of the fixed electrodes 32 and 42.

(1) At the sites where the side surfaces of the movable electrodes 24 face the side surfaces of the fixed electrodes 32 and 42, adhesion-preventing projecting portions 50 are equipped to the side surfaces of the fixed electrodes 32 and 42 so that the projecting portions 50 are arranged along the longitudinal direction of the electrodes 24, 32 and 42 while projecting from the side surfaces of the fixed electrodes 32 and 40.

(2) When L represents the length of each site where the side surface of each movable electrode 24 face the side surface of each of the fixed electrodes 32 and 42, and La represents the distance between neighboring projecting portions of the projecting portions 50 thus arranged, the ratio of the distance La to the length L (La/L) ranges from 0.1 to 0.9 (see FIG. 7). According to the acceleration sensor S2 having the feature point as described above, when the movable electrodes 24 come into contact with the fixed electrodes 32 and 42, these electrodes come into contact with one another through the tip portions of the projecting portions 50, so that the contact area can be reduced. Therefore, the sticking between each movable electrode 24 and each fixed electrode 32 (42) can be suppressed.

Furthermore, when each movable electrode 24 and each fixed electrode 32, 42 come into contact with each other through the projecting portions 50, both the electrodes 24 and 32 (42) located between the neighboring projecting portions 50 sag. The sagging aspect of these electrodes is shown in FIG. 7. At this time, by setting the ratio La/L to a value in the range from 0.1 to 0.9, the sagging amount of the electrodes 24, 32 and 42 between the projecting portions 50 can be reduced, and thus the contact between each movable electrode 24 and each fixed electrode 32 (42) due to the sagging of these electrodes between the projecting portions 50 can be prevented. This will be described in more detail.

In this embodiment, when each fixed electrode 32 (42) comes into contact with each movable electrode 24, they come into contact with each other through the projecting portions 50. Therefore, the height d2 (see FIG. 7) of the projecting portions 50 corresponds to the gap between the movable and fixed electrodes under the contact state.

Here, both the movable electrode 24 and the fixed electrode 32, 42 sag between the projecting portions which come into contact with each other. For example, when each of the movable and fixed electrodes 24 and 32 (42) sags between the neighboring portions 50 by a half of the height d2, both the electrodes 24 and 32 (42) come into contact with each other. Therefore, the sagging amount is required to be set to a half or less of the height d2 of the projecting portion 50.

The sagging amount of the electrodes 24, 32 and 42 is represented by the following equation (2):

$$\sigma 1(x) = \{Fe(x) \cdot La^3\}/(48 \cdot E \cdot I) \quad (2)$$

Here, the sagging amount and the electrostatic attraction between the electrodes are represented by functions of a voltage x, that is, σ1 (x) and Fe(x), respectively. La represents the distance between the neighboring projecting portions of the arranged projecting portions 50, and E and I represent the Young's modulus of the electrodes and the cross-section quadratic moment.

That is, as is apparent from the equation (2), the apparent length of the electrodes (that is, the distance La) is shortened by the arrangement of the projecting portions 50, whereby the sagging amount can be suppressed. The shortening of the distance La as described above increases the number of the projecting portions 50.

If the number of the projecting portions 50 is increased, the sagging amount would be reduced; however, it is not good that the number of the projecting portions 50 be merely increased. If the number of the projecting portions 50 is increased, the contact area between the movable electrode 24 and the fixed electrode 32 (42) would be increased, so that the sticking suppression effect is reduced.

Furthermore, if the number of projecting portions 50 is too large, the detection interval between the movable electrode 24 and the fixed electrode 32 (42) would not completely correspond to the interval between the side surfaces of both the electrodes, and it is dependent on the projecting portions 50, so that the detection interval may be different from a design value in some cases.

Therefore, it is required to set the number of the projecting portions 50 to a required minimum value. For example, in order to prevent the contact between the electrodes due to the sagging of the electrodes between the projecting portions 50, the number of the projecting portions 50 at which the sagging amount is equal to the half or less of the height d2 of the projecting portions 50 is required at the minimum.

Furthermore, in this embodiment, the upper limit of the number of the projecting portions 50 is set to ten. If the number of the projecting portions 50 is increased to about 10, the effect of the above disadvantage would be small. This means that the ratio La/L is set to 0.1 or more.

The inventor of this application has tested the relationship between the ratio La/L and the sagging amount. The result is shown in FIGS. 8, 9 and 10.

Figure 8:
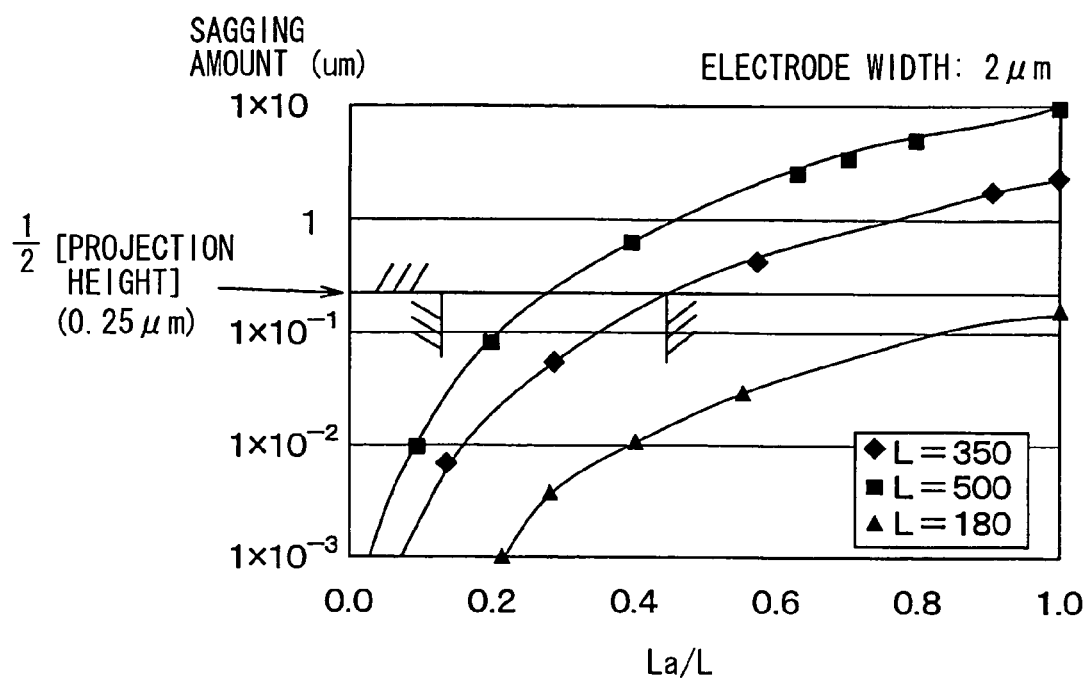
FIG. 8 is a diagram of a test result showing the relationship between a ratio La/L and a sagging amount when the electrode width is set to 2 μm.
Figure 9:
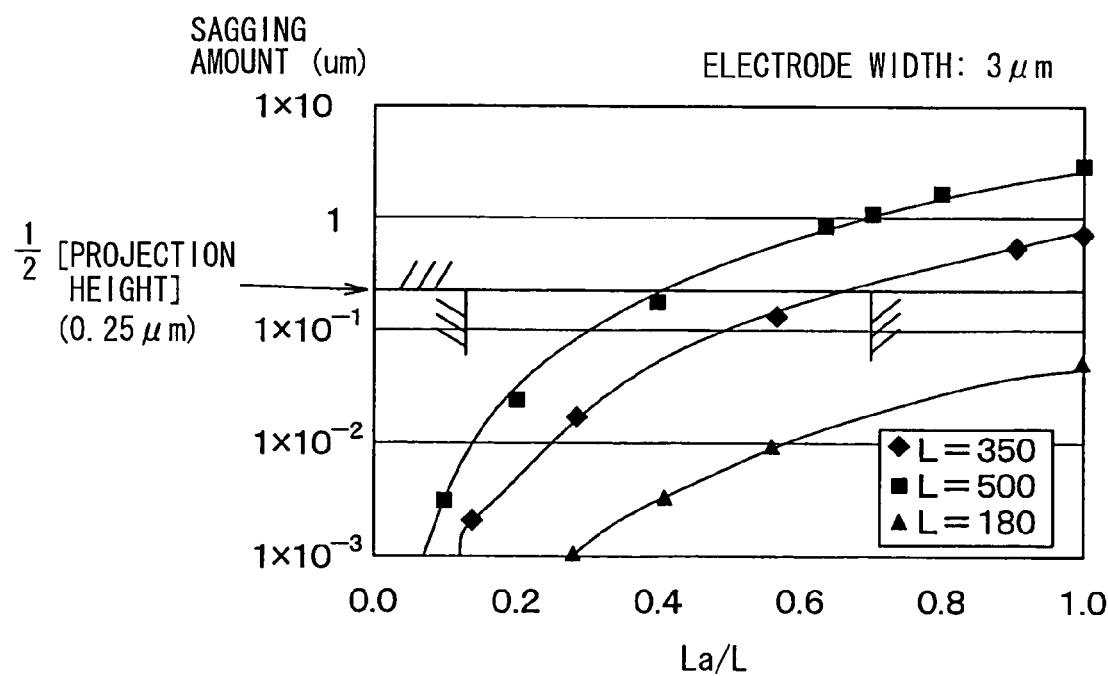
FIG. 9 is a diagram of a test result showing the relationship between a ratio La/L and a sagging amount when the electrode width is set to 3 μm.
Figure 10:
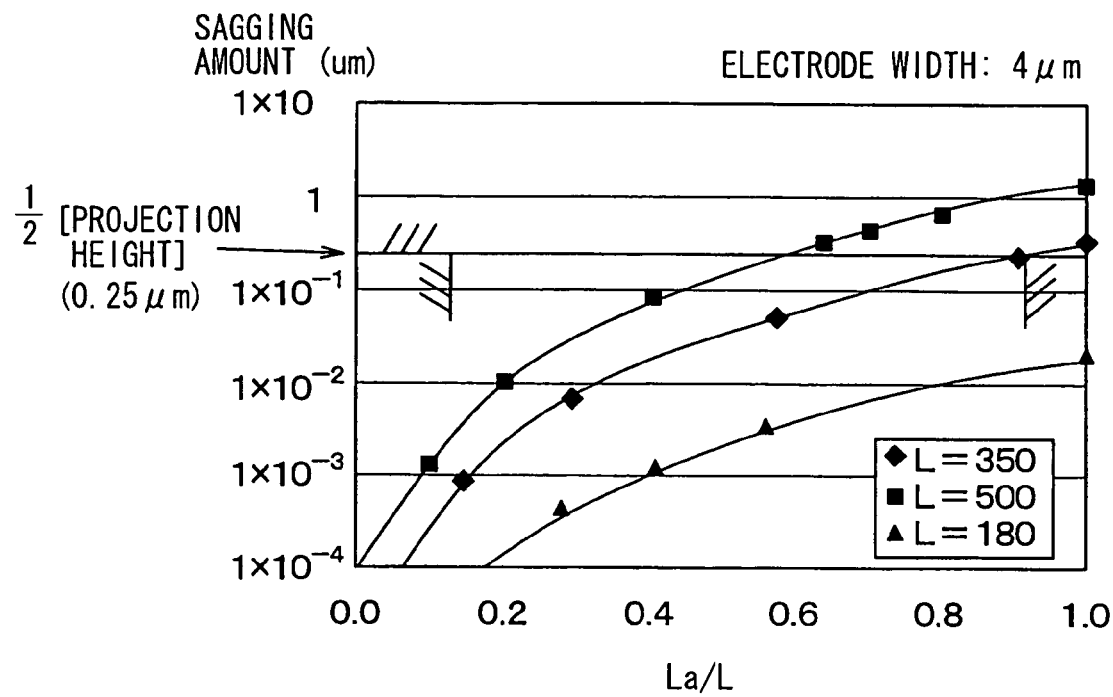
FIG. 10 is a diagram of a test result showing the relationship between a ratio La/L and a sagging amount when the electrode width is set to 4 μm.

FIG. 8 shows a test result when the width of each of the movable electrode 24 and the fixed electrode 32 (42) was set to 2 μm, FIG. 9 shows a test result when the width of each of the movable electrode 24 and the fixed electrode 32, 42 was set to 3 μm, and FIG. 10 shows a test result where the width of each of the movable electrode and the fixed electrode 32 (42) was set to 4 μm.

FIGS. 8 to 10 show the test results of the sagging amount with variation of the ratio La/L when the length L of the sites where the side surfaces of the movable electrodes 14 face the side surfaces of the fixed electrodes 32 and 42 is changed to 180 μm, 350 μm and 500 μm. The sagging amount means the sagging amount of the electrodes between the projecting portions 50, that is, the sagging amount of the electrodes over the distance La.

In FIGS. 8 to 10, the upper limit of the ratio La/L is determined on the basis of the value achieved when the sagging amount is equal to the half or less of the height d2 of the projecting portions 50. In this case, the height d2 of the projecting portions 50 is set to 0.5 μm, and the half of the height d2 is equal to 0.25 μm. The lower limit of the ratio La/L is set to 0.1 or more.

By determining the respective parameters as described above, the sagging amounts of the electrodes 24, 32, 42 between the neighboring projecting portions can be reduced while also preventing disadvantages caused by an excessive large number of the projecting portions 50, and the contact based on the sagging can be properly prevented.

As is apparent from results shown in FIGS. 8 to 10, the following conditions may be provided in order to properly prevent the contact due to the sagging of the electrodes 24, 32, 42 between the projecting portions 50.

As is apparent from the result of FIG. 8, when the length L is set to 500 μm or less and the widths of the movable electrodes 24 and the fixed electrodes 32, 42 are equal to 2 μm, the ratio La/L is preferably set to a value in the range from 0.1 to 0.5.

As is apparent from the result of FIG. 9, when the length L is set to 500 μm or less and the width of the movable electrodes 24 and the fixed electrodes 32, 42 is equal to 4 μm, the ratio La/L is preferably set to a value in the range from 0.1 to 0.7.

As is apparent from the result of FIG. 10, when the length L is set to 500 μm or less and the width of the movable electrodes 24 and the fixed electrodes 32, 42 is equal to 4 μm, the ratio La/L is preferably set to a value in the range from 0.1 to 0.9.

As shown in FIGS. 8 to 10, when the length L is short (for example, 180 μm), the sagging amount is small, and thus it is sufficient that the ratio La/L is equal to 1. That is, it is sufficient that every one projecting portion 50 is equipped at each of both the ends of each electrode (that is, totally two projecting portions 50 are equipped to each electrode).

In FIGS. 8 to 10, the width of each of the movable electrodes 24 and the fixed electrodes 32 and 42 contain an error of about ±10% in consideration of tolerance in the manufacturing process. For example, in FIG. 8, the electrode width is set to 2 μm; however, the same result would be achieved if the width concerned ranges from 1.8 μm to 2.2 μm.

As shown in FIGS. 8 to 10, the optimum value of the ratio La/L is varied in accordance with the length L, the widths of the electrodes 24, 32, 42, etc. However, if the ratio La/L ranges from 0.1 to 0.9, the sagging amount can be properly suppressed and the sticking can be prevented.

Furthermore, according to the acceleration sensor S1, the sticking can be prevented by equipping the projecting portions 50 and merely defining the arrangement style of the projecting portions 50 on the basis of the ratio La/L, and increase of the size of the substrate 10 is not caused.

As described above, according to the acceleration sensor S2 shown in FIGS. 5 to 7, when the movable electrodes 24 and the fixed electrodes 32 and 42 are increased in length to enhance the sensitivity, the sticking between the electrodes 24 and 32 (42) can be prevented at maximum with suppressing the increase of the body size as much as possible.

[Modification]

Figure 12:
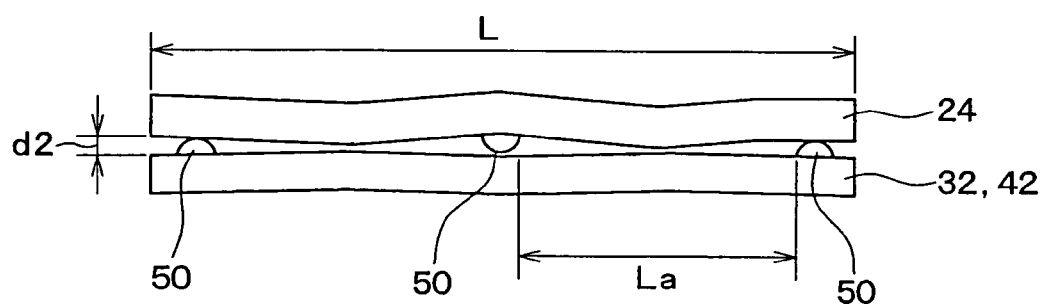
FIG. 12 is an enlarged plan view showing a site where the side surface of a movable electrode and the side surface of a fixed electrode face each other in the acceleration sensor shown in FIG. 11.
Figure 11:
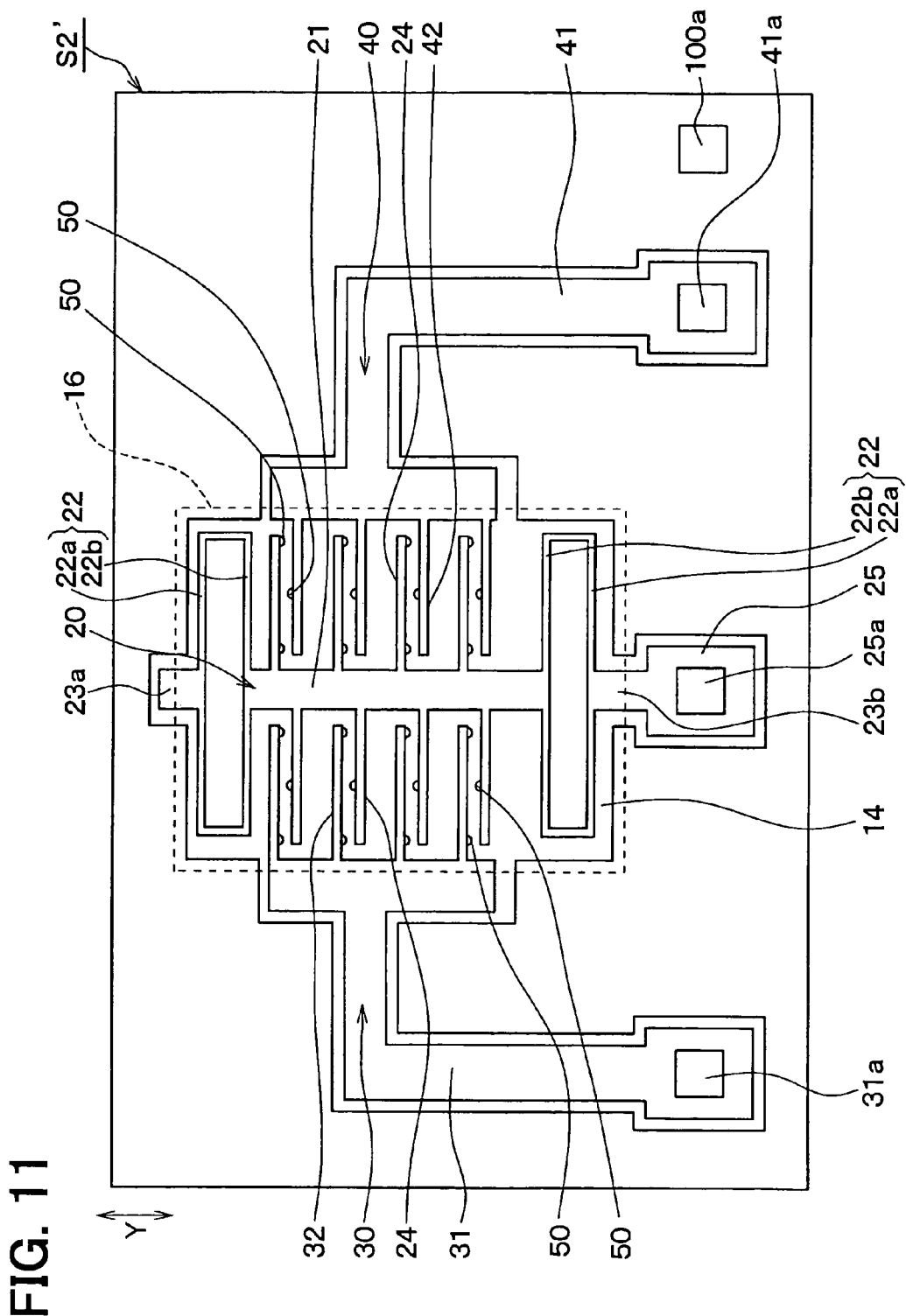
FIG. 11 is a diagram showing the planar construction of a differential capacitance type acceleration sensor according to a modification to the second embodiment.

FIG. 11 is a diagram showing a planar construction of a differential capacitance type acceleration sensor S2' as a modification of the second embodiment. FIG. 12 is an enlarged plan view showing a site at which the side surface of each movable electrode 24 and the side surface of each fixed electrode 32 (42) are confronted to each other in the sensor S2'.

In the acceleration sensor S2 shown in FIGS. 5 to 7, the projecting portions 50 are equipped to the side surfaces of the fixed electrodes 32 and 42 at the sites where the side surfaces of the movable electrodes 24 face the side surfaces of the fixed electrodes 32 and 42. In the acceleration sensor S2' of this modification, adherence-preventing projecting portions 50 are equipped to the side surfaces of the movable electrodes 24 and the side surfaces of the fixed electrodes 32 and 42 at the sites where the side surfaces of the movable electrodes 24 face the side surfaces of the fixed electrodes 32 and 42 so that the projecting portions 50 project from the side surfaces concerned and are arranged along the longitudinal direction of the electrodes 24, 32 and 42.

In this case, the ratio La/L is also set in the range from 0.1 to 0.9. Accordingly, the acceleration sensor S2' having the same operation and effect as the acceleration sensor S2 shown in FIGS. 5 to 7 is provided.

In the acceleration sensor S2' of this modification, the same result as shown in FIGS. 8 to 10 is achieved for the relationship between the ratio La/L and the sagging amount in the case of the electrode width of 2 µm, 3 µm, 4 µm.

Furthermore, at the sites where the side surfaces of the movable electrodes 24 face the side surfaces of the fixed electrodes 32 and 42, the projecting portions 50 may be equipped to only the side surfaces of the movable electrodes 24, and the ratio La/L may be set in the range from 0.1 to 0.9.

In this case, there can be achieved the same operation and effect as the construction in which the projecting portions 50 are equipped to the side surfaces of the fixed electrodes 32 and 42 at the sites where the side surfaces of the movable electrodes 24 face the side surfaces of the fixed electrodes 32 and 42.

As described above, according to this embodiment, in the differential capacitance type acceleration sensor as the capacitance type semiconductor dynamic quantity sensor, at the sites where the side surfaces of the movable electrodes 24 face the side surfaces of the fixed electrodes 32 and 42, projecting portions 50 are equipped to the side surfaces of at least one electrodes of the movable electrodes 24 and the fixed electrodes 32 (42) so that the projecting portions 50 are arranged along the longitudinal direction of the electrodes 24, 32 and 42, and also the ratio La/L is set in the range from 0.1 to 0.9.

Accordingly, when the movable electrodes 24 and the fixed electrodes 32 and 42 are increased in length to enhance the sensitivity, the sticking between the electrodes 24 and 32 (42) can be prevented at maximum with suppressing the increase of the body size as much as possible.

Third Embodiment

Here, the composite style of the first and second embodiments may be adopted. The third embodiment of the present invention provides such a composite capacitance type semiconductor dynamic sensor, and a unique feature point of this embodiment will be mainly described.

Figure 13:
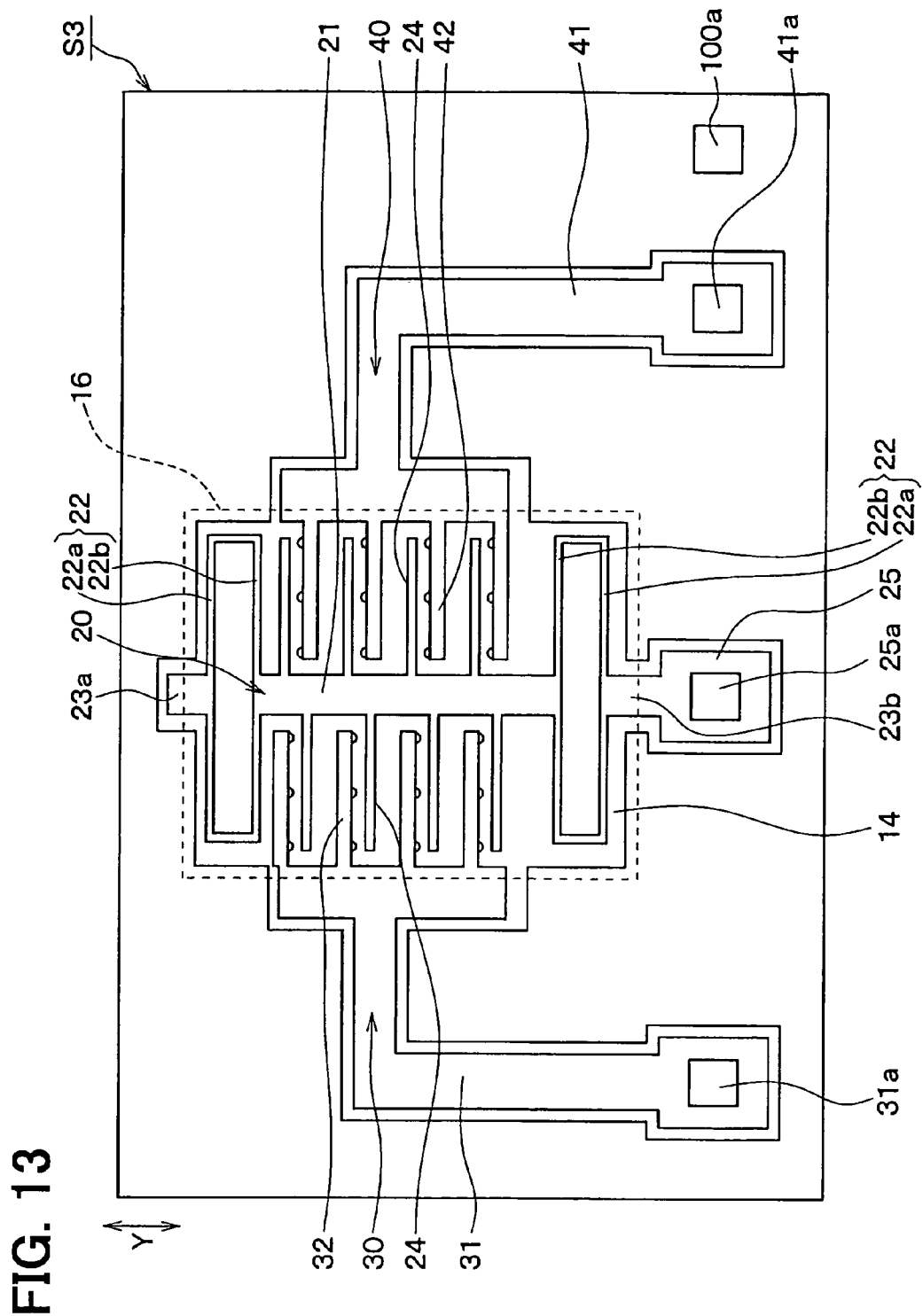
FIG. 13 is a plan view showing a differential capacitance type acceleration sensor as a capacitance type semiconductor dynamic quantity sensor according to a third embodiment.

FIG. 13 is a plan view showing a differential capacitance type acceleration sensor S3 as a capacitance type semiconductor dynamic quantity sensor according to a third embodiment of the present invention.

The acceleration sensor S3 of this embodiment is also equipped with a support substrate 15, beam-shaped movable electrodes 24 which are formed of semiconductor and supported so as to be displaceable with respect to the support substrate 15 in the displacement direction Y in accordance with application of acceleration, and beam-shaped fixed electrodes 32 and 42 which are formed of semiconductor and fixedly mounted on the support substrate 15 so that the side surfaces thereof face the side surfaces of the movable electrodes 24.

When the movable electrodes 24 are displaced in accordance with application of a dynamic quantity, the applied dynamic quantity is detected on the basis of variation of the electrostatic capacitance between the side surface of each movable electrode 24 and the side surface of each fixed electrode 32, 42.

In the acceleration sensor S3 of this embodiment, the width of at least one of the movable electrode 24 and the fixed electrode 32 (42) is set to be larger than the width of the other electrode.

In the case of FIG. 13, the width W2 of the fixed electrodes 32 and 42 is set to be larger than the width W1 of the movable electrodes 24. In this example, the width W1 of the movable electrodes 24 is set to be larger than the width W2 of the fixed electrodes 32 and 42.

Furthermore, according to this embodiment, at the sites where the side surfaces of the movable electrodes 24 face the side surfaces of the fixed electrodes 32 and 42, projecting portions 50 are equipped to the side surfaces of at least one electrodes of the movable electrodes 24 and the fixed electrodes 32 (42) so as to be arranged along the longitudinal direction of the electrodes 24, 32 and 42.

In the case shown in FIG. 13, the projecting portions 50 are equipped to the fixed electrodes 32 and 42. The projecting portions 50 may be equipped to the movable electrodes 24 or both the movable 24 and fixed electrodes 32 (42).

In this embodiment, the ratio La/L is set in the range from 0.1 to 0.9. According to this embodiment, the acceleration sensor S3 having the same operation and effect as the first embodiment and also the same operation and effect as the second embodiment can be provided.

In this embodiment, the width of the width-larger electrodes is set to be larger than the width of the width-smaller electrodes by 0.5 µm or more, and preferably the width of the width-larger electrodes is set to be larger than the width of the width-smaller electrodes by the double or less of the width of the width-smaller electrodes.

Furthermore, in this embodiment, when the length L is set to 500 µm or less and the width of the movable electrodes 24 and the fixed electrodes 32 and 42 is set to 2 µm, the ratio La/L is preferably set to 0.1 to 0.5.

Still furthermore, in this embodiment, when the length L is set to 500 µm or less and the width of the movable electrodes 24 and the fixed electrodes 32 and 42 is set to 4 µm, the ratio La/L is preferably set to 0.1 to 0.7.

Still furthermore, in this embodiment, when the length L is set to 500 µm or less and the width of the movable electrodes 24 and the fixed electrodes 32 and 42 is set to 4 µm, the ratio La/L is preferably set to 0.1 to 0.9.

In this embodiment, the other examples and the modifications, the preferable modes, etc. described in the first and second embodiments may be adopted and also the same effect can be achieved.

Fourth Embodiment

As described above, in the acceleration sensors of the above-described embodiments, when acceleration is applied, the spring portions 22 are displaced, and the capacitance between the movable electrode 24 and the fixed electrode 32, 42 is varied. The capacitance variation thus occurring is converted to the corresponding voltage by a switched capacitor circuit (SC circuit) to detect the acceleration (see FIG. 3).

Here, in the acceleration sensor, some constant voltage (called as an actual operating voltage) is applied between each movable electrode 24 and each fixed electrode 32 (42) when acceleration is detected. This actual operating voltage is equal to Vcc/2 in FIG. 3.

Furthermore, in the acceleration sensor as described above, a release voltage is determined through tests. The release voltage is a voltage under which each movable electrode 24 and each fixed electrode 32 (42) comes into contact with each other and then both the electrodes are separated from each other during a test work.

Figure 14:
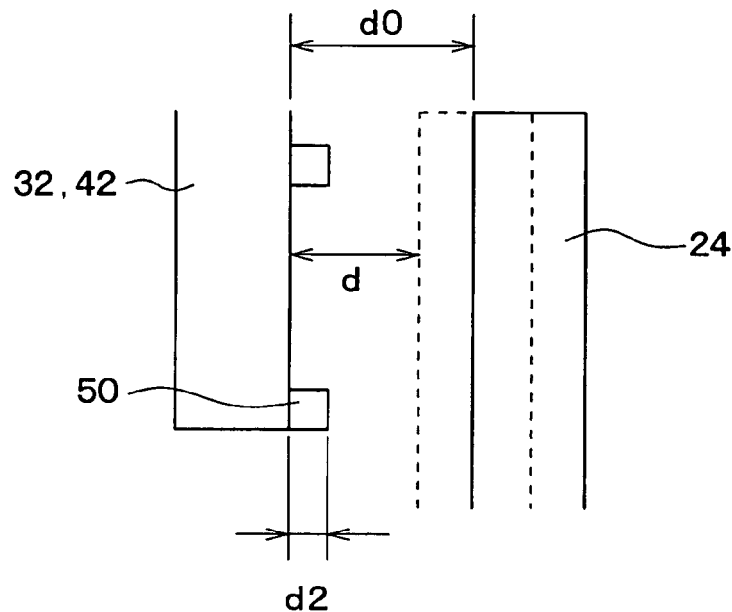
FIG. 14 is a diagram showing a displacement aspect between the movable electrode and the fixed electrode.

A specific test method of the release voltage will be described with reference to FIGS. 14 and 15. FIG. 14 is a diagram showing an aspect of the displacement between each movable electrode 24 and each fixed electrode 32 (42). In this case, it is assumed that the projecting portions 50 are equipped to the fixed electrodes 32 and 42.

As shown in FIG. 14, the initial interval between the electrodes (hereinafter referred to as "initial inter-electrode interval") is represented by d0, an inter-electrode interval after the displacement is represented by d, and the height (projection amount) of the projecting portions 50 is represented by d2. The area of the confronting portion between the electrodes 24 and 32 (42) which confront each other, that is, the inter-electrode area is represented by A.

Figure 15:
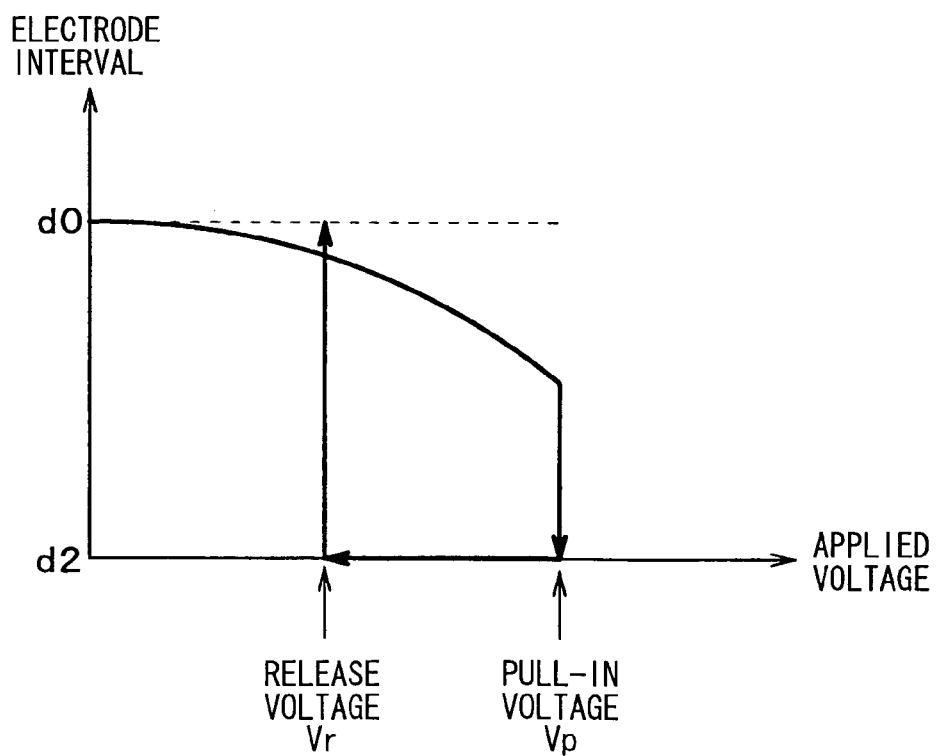
FIG. 15 is a diagram showing the relationship between a voltage applied between the electrodes and the interval between the electrodes in a testing processing for determining a release voltage.

FIG. 15 is a diagram showing the relationship between the electrode interval and the applied voltage (inter-electrode applied voltage) which is applied between the movable electrode 24 and the fixed electrode 32 (42) in the test step for determining the release voltage. Here, as shown in FIG. 14, the electrode interval varies from the initial electrode interval d0 to the interval d2 when the movable electrode 24 comes into contact with the projecting portions 50, that is, the height d2 of the projecting portions 50.

As shown in FIG. 15, as the applied voltage between the movable electrode 24 and the fixed electrode 32 (42) is increased, the electrode interval d is gradually reduced. Under some voltage, the electrode interval is equal to d2, and both the movable electrode 24 and the fixed electrode 32 (42) come into contact with each other. The voltage Vp at this time is called a pull-in voltage.

As the applied voltage is reduced from the pull-in voltage, the movable electrode 24 and the fixed electrode 32 (42) are separated from each other under some voltage, and the electrode interval is returned to the initial electrode interval d0. The voltage Vr at this time is the release voltage.

On the basis of the release voltage thus determined, the actual operating voltage is set to be lower than the release voltage, and the sticking between the movable electrode 24 and the sticking between the movable electrode 24 and the fixed electrode 32 (42) is prevented.

For example, the actual operating voltage is set to 2.5 V, and the spring constant of the spring portions 22, the inter-electrode initial capacitance, etc. must be designed so that the fixed electrode 32 (42) and the movable electrode 24 are not brought into contact with each other by electrostatic attraction under this voltage.

The release voltage is determined on the basis of the electrostatic attraction between the electrodes and the spring constant of the spring portions, and further the electrostatic attraction is affected by the reduction of the gap between the electrodes due to the sagging amount and the depletion layer in the electrode surface. This embodiment provides an expression for the release voltage which is achieved in consideration of these effects.

Here, the release voltage is represented by Vr. Furthermore, the initial electrode interval is represented by d0, the electrode interval after the displacement is represented by d, the height (projection amount) of the projecting portions 50 is represented by d2, and the area between the confronting electrodes is represented by A. The spring constant of the spring portions 22 is represented by k, and the dielectric constant of air is represented by ∈0.

With respect to the depletion layer in the electrode surface, even when the movable electrode 24 and the fixed electrode 32 (42) actually come into contact with each other, a capacitor is formed between these electrodes by the amount corresponding to thickness of the depletion layer spreading from the contact interface between the electrodes 24 and 32 (42) because the depletion layer concerned exists. Therefore, the thickness of the depletion layer in the electrode surface of the electrodes 24, 32, 42 is represented by f(wd).

The depletion layer in the electrode surface is determined by the substrate concentration, that is, the impurity concentration of the second silicon substrate 12. However, the thickness of the depletion layer is increased as the substrate concentration concerned is reduced, and thus the sticking occurs hardly. However, if the substrate concentration is reduced, the wire resistance is increased, and thus it is favorable that the substrate concentration ranges from $1\times10^{17}$ to $1\times10^{19}$ (/cm$^3$).

Furthermore, with respect to the sagging amount of the electrodes, an expression approximating the sagging amount represented by the equation (2) over the length direction of the electrodes is used. When the sagging amount thus approximated is represented by σ2(x), the sagging amount σ2(x) is represented by the following equation (3):

$$\sigma2(x)=[\{Fe(x)\cdot La^3\}/(48\cdot E\cdot I)]\times(5/8) \quad (3)$$

Here, $I=W^3\cdot h/12$ $$Fe(x)=\epsilon0\cdot V^2/(2\cdot d2^2)\cdot h\cdot L \quad (4)$$

Here, L represents the length of the electrodes, W represents the width of the electrodes, h represents the thickness of the electrodes, d2 represents the height of the projecting portions, La represents the interval between the projecting portions, V represents the voltage applied between the movable electrode and the fixed electrode, and Fe(x) represents the electrostatic force applied between the electrodes. In this case, the sagging amount σ2(x) corresponds to an amount by which the electrodes are deformed under the force Fe(x).

That is, the sagging amount σ2(x) represented in the equation (3) is achieved by multiplying σ1(x) of the equation (2) by 5/8.

The release voltage Vr is represented by using the parameters d0, d2, A, K, ∈, f(wd), σ2(x) according to the following equation (5):

$$Vr=(2k/\epsilon A)^{0.5}\cdot(d0-d2)\cdot[d2+f(wd)-\sigma2(x)]^{0.5} \quad (5)$$

In this embodiment, the release voltage Vr is determined by using the equation (5).

Accordingly, the release voltage can be calculated with high precision, and if the sensor is designed so that the release voltage is higher than the actual operating voltage, the sticking can be prevented in higher level.

Here, with respect to the relationship between each of the ratio La/L, the electrode width W and the height d2 of the projecting portions and the sagging amount σ2(x) as shown in FIGS. 8 to 9, it is preferable that La/L, W, d2 are determined so that the sagging amount σ2(x) is less than the half of the height d2 of the projecting portions (i.e., σ2(x)<d2/2 (6)).

In this case, when the beam-shaped electrodes have projecting portions, both the enhancement of the sensitivity and the prevention of the sticking between the beam-shaped electrodes can be performed.

Other Embodiments

The arrangement of the movable electrodes and the fixed electrodes is not limited to the comb-shaped arrangement, and any arrangement (shape) may be adopted insofar as the side surfaces of the beam-shaped electrodes face each other.

The above embodiments have been described by using the acceleration sensor. However, the present invention is not limited to the acceleration sensor. That is, the present invention may be applied to any capacitance type dynamic quantity sensor which is equipped with a support substrate, beam-shaped movable electrodes formed of semiconductor which are supported so as to be displaceable with respect to the support substrate in a predetermined direction in accordance with application of a dynamic quantity, and beam-shaped fixed electrodes formed of semiconductor which are fixedly supported on the support substrate and arranged so that the side surfaces thereof face the side surfaces of the movable electrodes, and in which when the movable electrodes are displaced in accordance with application of a dynamic quantity, the applied dynamic quantity is detected on the basis of the variation of the electrostatic capacitance between the side surfaces of the movable and fixed electrodes.

For example, the present invention may be applied to a capacitance type semiconductor dynamic quantity such as an angular velocity sensor, a pressure sensor or the like in addition to the acceleration sensor.

What is claimed is:

1. A capacitance type semiconductor dynamic quantity sensor comprising:
   a support substrate;
   a ben-shaped movable electrode displaceable in response to application of a dynamic quantity to the support substrate; and
   beam-shaped fixed electrodes fixedly supported on the support substrate so that side surfaces thereof face a side surface of the movable electrode, the applied dynamic quantity being detected on the basis of variation in electrostatic capacitance between the side surface of the movable electrode and the side surface of each of the fixed electrodes when the movable electrode is displaced in response to the application of the dynamic quantity, wherein:
   the side surface of one of the movable electrode and the fixed electrodes is equipped with adherence preventing projecting portions projecting from the side surface concerned at sites where the side surfaces of the movable and fixed electrodes face each other so that the projecting portions are arranged along a longitudinal direction of the one of the movable and the fixed electrodes;
   when L represents the length of the movable and fixed electrodes at the sites where the side surfaces of the movable and fixed electrodes face each other, La represents the distance between neighboring projecting portions in the arrangement of the projecting portions, σ2(x) represents a sagging amount of one of the movable electrode and the beam-shaped fixed electrodes between the projecting portions, E and I represent the Young's modulus of the movable and fixed electrodes and the cross-section quadratic moment, W represents the width of the movable and fixed electrodes, h represents the thickness of the movable and fixed electrodes, d2 represents the height of the projecting portions, V represents the voltage applied between the movable electrode and the fixed electrode, and Fe(x) represents the electrostatic force applied between the movable and fixed electrodes, $$\sigma2(x)=[Fe(x)\cdot La^3]/(48\cdot E\cdot I)]x(5/8)$$

$$I=W^3h/12$$

$$Fe(x)=\epsilon0\cdot V^2/(2\cdot d2^2)\cdot h\cdot L;\text{ and}$$

La/L, W, d2 are determined so that the sagging amount σ2(x) is less than half of the height d2 of the projecting portions (σ2(x)<d2/2).

2. The capacitance type semiconductor dynamic quantity sensor according to claim 1, wherein the ratio of the distance La to the length L (La/L) is set in the range from 0.1 to 0.9.

3. The capacitance type semiconductor dynamic quantity sensor according to claim 1, wherein the projecting portions are equipped to the side surfaces of both the movable and fixed electrodes at sites where the side surfaces of the movable and fixed electrodes face each other.

4. The capacitance type semiconductor dynamic quantity sensor according to claim 1, wherein one of the movable electrode and the fixed electrodes is a width-larger electrode and an other of the movable electrode or the fixed electrodes is a width-smaller electrode, wherein the width-larger electrode has a larger width than that of the width-smaller electrode.

5. The capacitance type semiconductor dynamic quantity sensor according to claim 4, wherein the width-larger electrode out of the movable and fixed electrodes is preferably set to be larger in width than the width-smaller electrode by 0.5 μm or more.

6. The capacitance type semiconductor dynamic quantity sensor according to claim 1, wherein when the length L is set to 500 μm or less and the width of the movable and fixed electrodes is set to 2 μm, the ratio La/L is set in the range from 0.1 to 0.5.

7. The capacitance type semiconductor dynamic quantity sensor according to claim 3, wherein when the length L is set to 500 μm or less and the width of the movable and fixed electrodes is set to 3 μm, the ratio La/L is set in the range from 0.1 to 0.7.

8. The capacitance type semiconductor dynamic quantity sensor according to claim 1, wherein when the length L is set to 500 μm or less and the width of the movable and fixed electrodes is set to 4 μm, the ratio La/L is set in the range from 0.1 to 0.9.

9. The capacitance type semiconductor dynamic quantity sensor according to claim 1, wherein a plurality of movable electrodes are disposed in a comb-shaped arrangement, and a plurality of fixed electrodes are disposed in a comb-shaped arrangement so as to be fitted in the gaps between the teeth of the comb-shaped arrangement of the movable electrodes.

* * * * *